United States Patent [19]

Foss et al.

[11] Patent Number: 4,991,143
[45] Date of Patent: Feb. 5, 1991

[54] MOBILE TARGET ACOUSTIC SYSTEM

[75] Inventors: Rene N. Foss; Edward W. Early, both of Seattle, Wash.

[73] Assignee: The United States of America as represented by the Secretary of the Navy, Washington, D.C.

[21] Appl. No.: 694,026

[22] Filed: Dec. 22, 1967

[51] Int. Cl.⁵ .............................................. H04K 3/00
[52] U.S. Cl. .......................................... 367/1; 434/6
[58] Field of Search ...................... 340/2, 3 E, 5, 5 D; 114/20, 20.1; 367/1; 434/6

[56] References Cited

U.S. PATENT DOCUMENTS

| | | | |
|---|---|---|---|
| 2,872,673 | 2/1959 | Pleasure | 342/172 |
| 2,922,157 | 1/1960 | McShan | 342/172 |
| 2,975,396 | 3/1961 | Mueller | 367/1 |
| 2,981,927 | 4/1961 | McKenney | 367/1 |
| 3,018,478 | 1/1962 | Skillman et al. | 367/1 |
| 3,110,026 | 11/1963 | Babour, Jr. et al. | 342/172 |
| 3,180,295 | 4/1965 | Niederer | 114/20.1 |

Primary Examiner—Thomas H. Tarcza
Assistant Examiner—Daniel T. Pihulic

[57] ABSTRACT

This system is directed to an acoustic target simulator for use with active and passive sonar systems. A receiver and a transmitter are mounted on the front and rear of the simulator. Separate high frequency channels are provided for the front transmitter and receiver and for the rear transmitter and receiver. The simulator utilizes a selector circuit that is operative upon receipt of a signal from one receiver-transmitter channel to disable the second receiver-transmitter channel. The simulator also includes a sonar becon which provides tracking capability for low-frequency sonars and an evasive action circuit which operates upon receipt of certain signals to disable the system.

16 Claims, 4 Drawing Sheets

MOBILE TARGET ACOUSTIC SYSTEM

BACKGROUND OF THE INVENTION

1. Field of the Invention

The invention relates to an acoustic target simulator for use primarily with sonar-equipped torpedoes.

In active sonar systems, sometimes called echo repeater systems, pulses are sent out from a submerged transmitter. If the pulses strike a target, they are reflected back in the direction of the transmitter where a submerged receiver picks up the reflected signal. The repetition rate of the pulses generally varies with the distance between the target and the transmitter and may serve to give information about the distance between them. A passive sonar system normally consists only of a submerged receiver which listens for noises generated by a possible target. Passive sonar systems have the advantage of being undetectable themselves and are most commonly used on submarines.

Active and passive sonar systems are mounted on ships as well as torpedoes. The primary purpose of a ship mounted sonar system is to locate submerged targets and therefore their active sonars utilize low frequency wide-beam signals. The primary purpose of the torpedo sonars on the other hand is to guide the torpedo to a target. Consequently, the signal emitted by active torpedo sonars is a high frequency narrow beam signal.

2. Description of the Prior Art

Various means are known in the prior art to simulate targets for active and passive sonars. These devices have a single receiver and a single transmitter and sometimes include a noise generator. They are operable either to generate noise or upon receipt of a sonar signal to amplify the signal and retransmit it. The retransmitted signal is similar to the echo produced by a submerged submarine or the hull of a surface vessel when a sonar signal is bounced off of it. These devices may provide a good acoustic pattern in one direction from the transmitter but have a hole or shadow in the other direction due to the body of the simulator.

As the sonar signal transmitted from an active ship-mounted sonar is sent out in a wide beam, the shadow produced by the vehicle body of the target is not as critical a factor as with the sonar-equipped torpedo. The narrow beam of the torpedo signal renders those devices which only provide a single transmitter and receiver unsuitable for use with active sonar-equipped torpedoes because the holes produced in the acoustic pattern may cause the torpedo to miss the simulator.

The standard evasive actions which submarines take against sonar-equipped torpedoes are silence and the deployment of expendable decoys. Surface vessels sometimes avoid such torpedoes by deploying explosive depth charges. The target simulators of the prior art are limited in that they are incapable of simulating such evasive actions.

SUMMARY OF THE INVENTION

The present invention presents an advancement over the prior art because it provides means by which the shadow produced by the body of a target in a single receiver-transmitter system is eliminated. It presents a further advance over the prior art in that it is capable of simulating a target for active as well as passive ship-mounted sonars and sonar-equipped torpedoes. A still further advancement lies in the ability of the simulator to initiate evasive action.

The target simulator of the present invention has a receiver and a transmitter mounted on its front and its rear sections. Separate channels are provided for the front transmitter and receiver and for the rear transmitter and receiver. In the active mode the system utilizes a selector circuit that is operative such that the first receiver-transmitter channel to receive a signal actuates the selector circuit to cause it to disable the second receiver-transmitter channel. A signal which comes from the rear 180° sector will be returned via the rear transmitter and a signal coming from the forward 180° sector will be returned via the front transmitter thus effectively eliminating the holes in the acoustic pattern. The system also includes a noise generator for operation in the passive mode and a sonar beacon which provides tracking capability for active ship-mounted sonars. An evasive action circuit is operable upon receipt of signals from a torpedo to disable the target and initiate evasive action. The evasive action may include the deployment of decoys or the explosion of depth charges.

It is an object of the present invention to provide an acoustic target simulator system.

It is another object of the present invention to provide an acoustic target simulator system which eliminates shadow in its transmitted signal.

It is another object of the present invention to provide an acoustic target simulator which is capable of undertaking evasive action.

It is a still further object of the present invention to provide a target which is capable of being tracked by active as well as passive sonar equipped torpedoes and by ship-mounted sonar systems.

The exact nature of this invention as well as other objects and advantages thereof will be readily apparent from consideration of the following specification relating to the annexed drawings.

BRIEF DESCRIPTION OF THE DRAWINGS

FIG. 3 shows the placement of FIGS. 2a and 2b;

DESCRIPTION OF THE PREFERRED EMBODIMENTS

Figure 1:
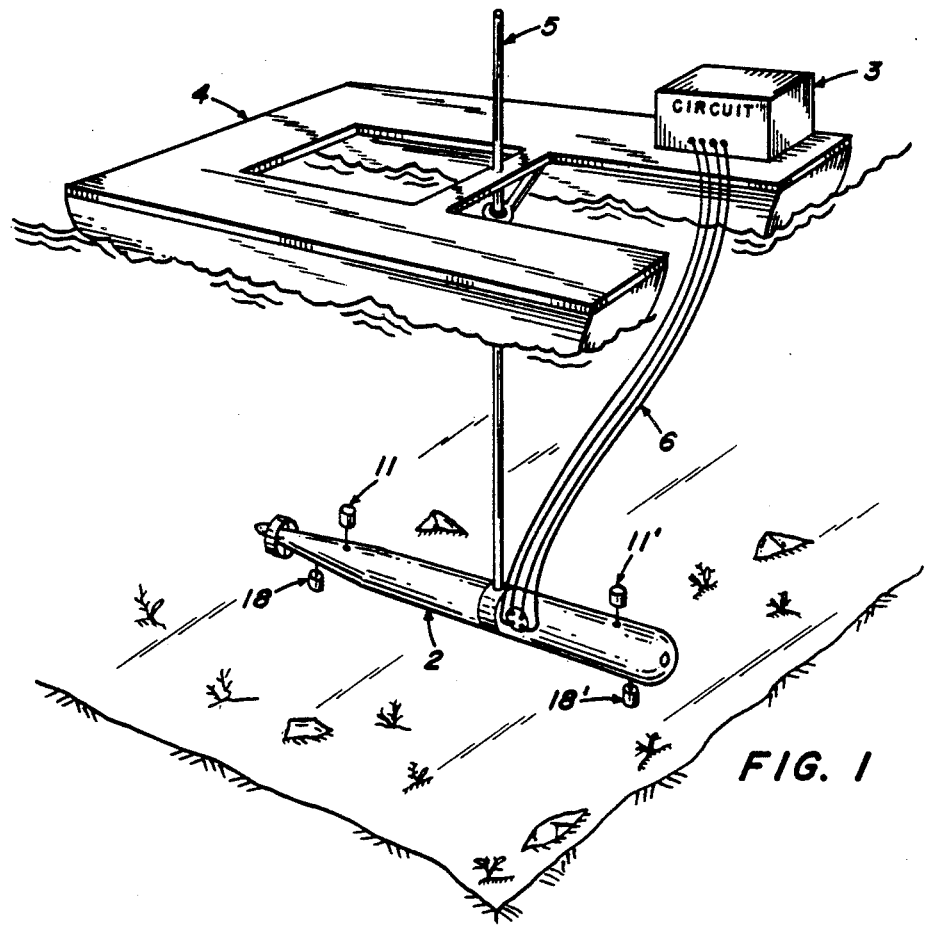
FIG. 1 shows the acoustic target simulator.

Referring now to FIG. 1, the target simulator 2 is shown mounted beneath a boat 4 and may be raised and lowered by support 5. The simulator utilizes a modified torpedo which may propel the boat. Receiver 11 and transmitter 18 are mounted on the rear of the target simulator and receiver 11' and transmitter 18' are mounted on the front of the simulator. The simulator circuit 3 is mounted on the boat and is connected with the simulator by wires 6.

The target simulator of the present invention has five modes of operation. In the first three modes, it can simulate a target either for a combined active and passive high-frequency sonar system or for an active high frequency system or for a passive sonar system. In the fourth mode the target can initiate evasive action in response to torpedo signals which have a certain predetermined repetition rate and in the final mode of operation it can simulate a target for low frequency sonar systems.

The first three modes of operation are performed by a high frequency sonar responsive circuit. The fourth mode is performed by an evasive action circuit and the fifth mode by a sonar beacon.

HIGH FREQUENCY SONAR RESPONSIVE CIRCUIT

Since any sonar system which can be carried in a torpedo must be small and have good directivity for proper guidance, sonar-equipped torpedoes use high frequency signals.

The high frequency sonar responsive circuit is responsive to signals from a torpedo-mounted sonar and performs the first three modes of operation of the simulator system.

Components

Figure 2A:
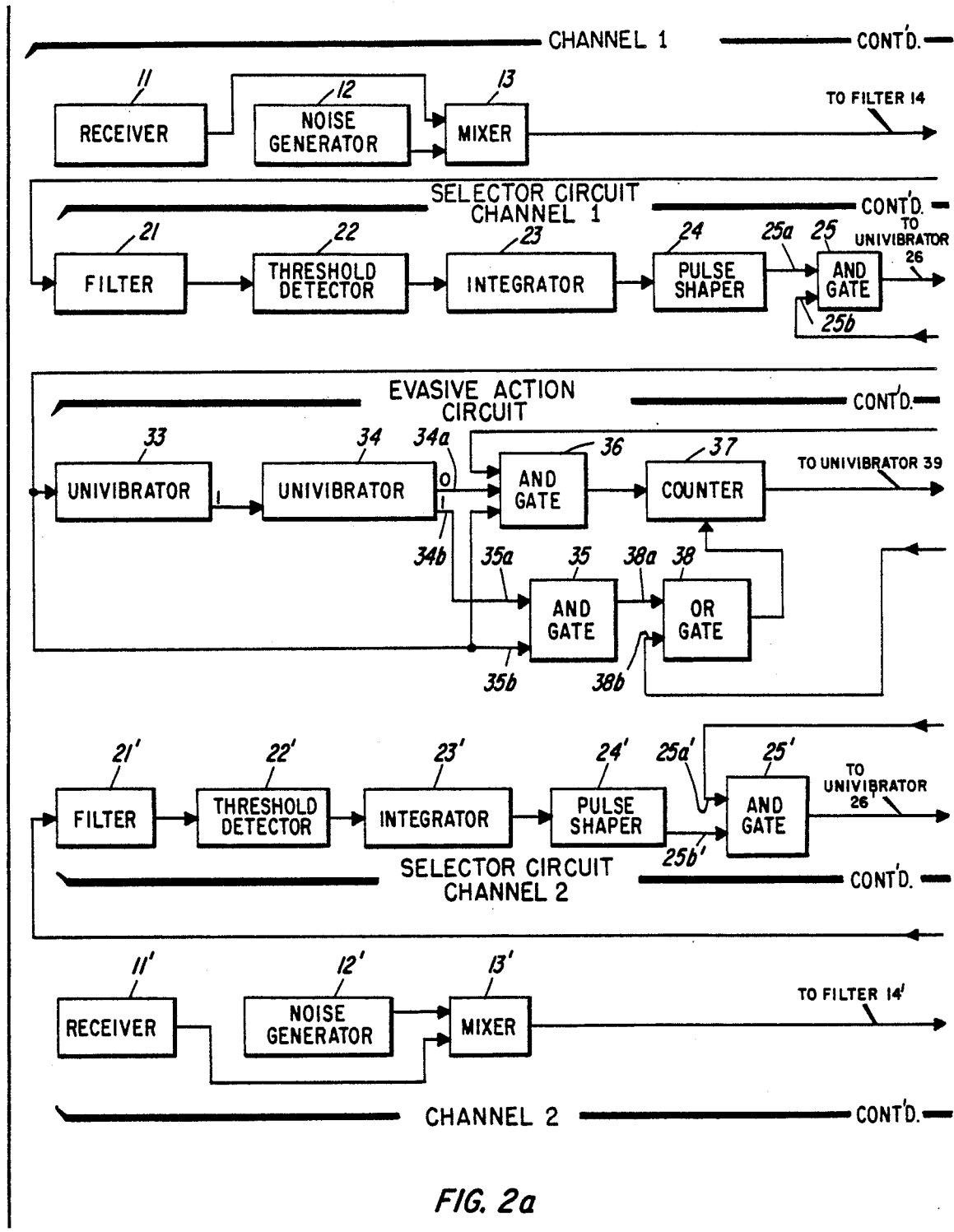
FIG. 2a is a block diagram of part of the acoustic target simulator circuit.
Figure 2B:
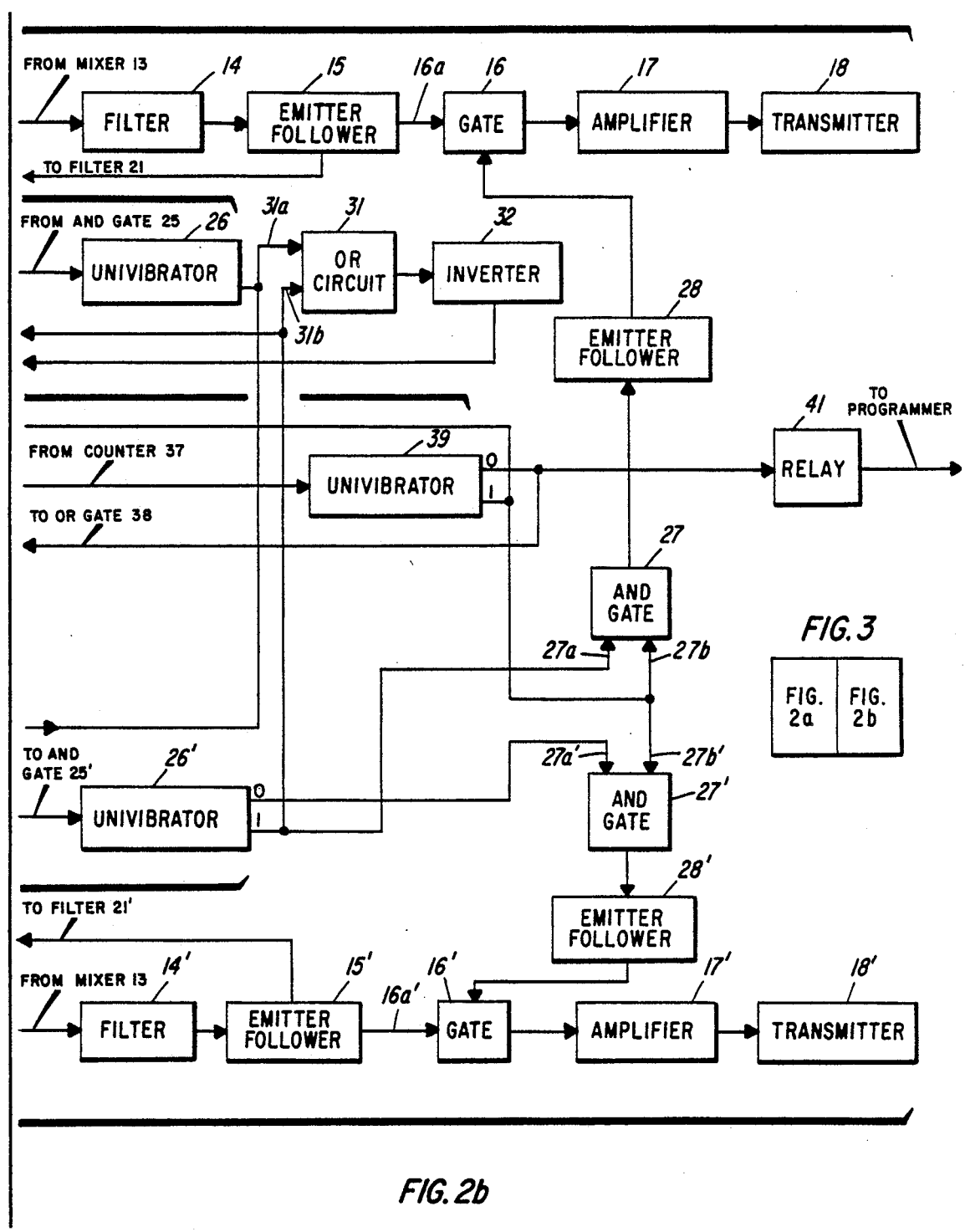
FIG. 2b is a block diagram showing the rest of the acoustic target simulator circuit.

Referring to the drawings, it can be seen from FIGS. 2a and 2b and FIG. 3 that the circuit generally includes two channels and a selector circuit. Each channel includes a receiver 11 and 11', a noise generator 12 and 12', and a mixer 13 and 13' where the signals of the receiver and noise generator are combined. Each channel further utilizes a bandpass filter 14 and 14' centered about the frequency of the torpedo signal and an emitter follower 15 and 15' connected to receive the filtered output. A gate 16 and 16', an amplifier 17 and 17' and a transmitter 18 and 18' are connected in series with the emitter follower.

The selector circuit includes in each channel a bandpass filter 21 and 21' centered about the frequency of the torpedo signal and connected to receive the torpedo signal through the emitter follower 15 and 15'. A threshold detector 22 and 22' in turn receives the output of the filter and is operative only in response to signals having a predetermined amplitude. In the selector circuit an integrator 23 and 23' is connected in series with the output of the threshold detector. The integrator absorbs 1 microsecond of all pulses which it receives to provide a delay and prevent the passage of pulses of less than one microsecond length. The threshold detector and the integrator are provided to prevent the triggering of the succeeding circuits by extraneous signals.

The selector circuit further includes a pulse shaper 24 and 24', an AND gate 25 and 25' and a univibrator 26 and 26' connected in series with the output of the integrator in each channel.

The signal steering circuit also utilizes AND gate 27 and 27' and emitter followers 28 and 28'.

Operation

In operation AND gate 27 is tied to the normally up side of univibrators 39 and 26' and AND gate 27' is tied to the up side of univibrator 39 and the normally down side of univibrator 26'. Gate 16 and consequently channel 1 are therefore normally open while gate 16' and channel 2 are normally closed. In the drawings 1 indicates an output and is shown at the normally up side of a univibrator and 0 indicates no output and is shown at the normally down side of a univibrator.

In the first mode of operation, the combined active and passive mode, the torpedo sends out a signal which is picked up by receiver 11. The signal mixes with the signal from the noise generator 13 and is sent to the bandpass filter 14 which is centered about the frequency of the torpedo signal. The signal is passed through the emitter follower 15 and the normally open gate 16 to amplifier 17 and transmitter 18 where it is retransmitted in the direction from which the signal was received.

A signal from the emitter follower 15 is also sent to the signal selector circuit where it is filtered at bandpass filter 21 and passed through threshold detector 22 and integrator 23. The threshold detector 22 and integrator 23 are set to pass the normal pulse from the torpedo. The pulse from the integrator is refined by pulse shaper 24 and sent to AND gate 25 which is tied to the normally up side of univibrator 26'. If univibrator 26' is in its normal state, AND gate 25 will pass the signal to cause univibrator 26 to change state and inhibit AND gate 25' to prevent univibrator 26' from changing state and channel 2 from passing a signal.

The operation of channel 2 is identical to that of channel 1. Assuming that a pulse is being received by both 11 and 11' of such amplitude and length that both shapers 24 and 24' emit a pulse and assuming that 11' is closer to a torpedo than 11 and thus receives a pulse first, the delay times of both integrators 23 and 23' being identical (1 ms), AND gate 25' will receive a pulse before AND gate 25. Since AND gate 25' is tied to the normally up side of univibrator 26, the pulse will pass through gate 25' to univibrator 26' causing it to change state for 180 milliseconds. The time it takes a signal to travel the distance along the body of the simulator from 11' to 11 is much shorter than the 180 milliseconds that 26' is in the changed state and therefore assures that the pulse from the first channel will not arrive after 26' has changed back to its normal state. When univibrator 26' changes state, input 25b of AND gate 25 will receive no signal and AND gate 25 will be inhibited. The signal from shaper 24 will not pass through the AND gate and univibrator 26 cannot change state. When univibrator 26 changes state, input 27a of AND gate 27 will not receive a signal, normally open gate 16 will be inhibited and channel 1 cannot pass the signal received at 11. At the same time input 27a' of AND gate 27' will receive a signal, normally closed gate 16' will be open and channel 2 will be operative to retransmit the signal received at 11'.

Since gates 16 and 16' are controlled by the same univibrator 26', it is not possible for both channels to be open at the same time and no ambiguity can occur. The selector circuit assures that the transmitter in the sector which first receives the torpedo signal will transmit the signal and thereby give an acoustic pattern which will be free of holes.

In the second mode of operation the noise generator will be disconnected and no noise signal will be mixed with the torpedo signal at 13 and 13'.

In the third mode of operation receivers 11 and 11' are disconnected and a signal from noise generator 12 in normally open channel 1 will be transmitted through transmitter 18.

EVASIVE ACTION CIRCUIT

In the fourth mode of operation the target is capable of initiating evasive action and for this purpose the system includes an evasive action circuit. This circuit can operate a relay to initiate a programmed evasive action which serves to deceive the torpedo as to the actual target location by deploying decoys or the like. The circuit also deactivates the simulator so that it simulates a submarine running silent. This deception and deactivation serve an important purpose because in any torpedo exercising program testers do not want to risk having the torpedo come all the way in to the simulator and possibly hit it with subsequent loss of both the simulator and the torpedo.

The evasive action circuit prevents this by turning off a brief time or brief times when the torpedo is near. The target itself has no range information generally available to it, but at one point at least most torpedoes tell "how far away they are" and this is when the torpedo increases its pulse repetition rate. For a given torpedo this occurs at a fixed known range period, so by timing (for convenience) torpedo pulses from that point the target can turn off at an appropriate time. Counting pulses is better than actual timing in that if the torpedo turns away prematurely, the target will not turn off. The specific timing required will depend, of course, on the particular torpedo being exercised against.

Components

Referring to FIGS. 2a, 2b and 3, the evasive action includes an OR gate 31 connected to receive a signal either from univibrator 26 or 26' and an inverter 32 connected to receive the signal from the OR gate. Univibrators 33 and 34 and AND gates 45 and 36 are connected to the output of the inverter. The evasive action circuit further includes counter 37, univibrator 39 and OR gate 38 connected to reset the counter. The output of the univibrator 39 is connected to gates 27b and 27b' of AND gate 27 and 27' and to a relay 41.

Operation

Figure 4:
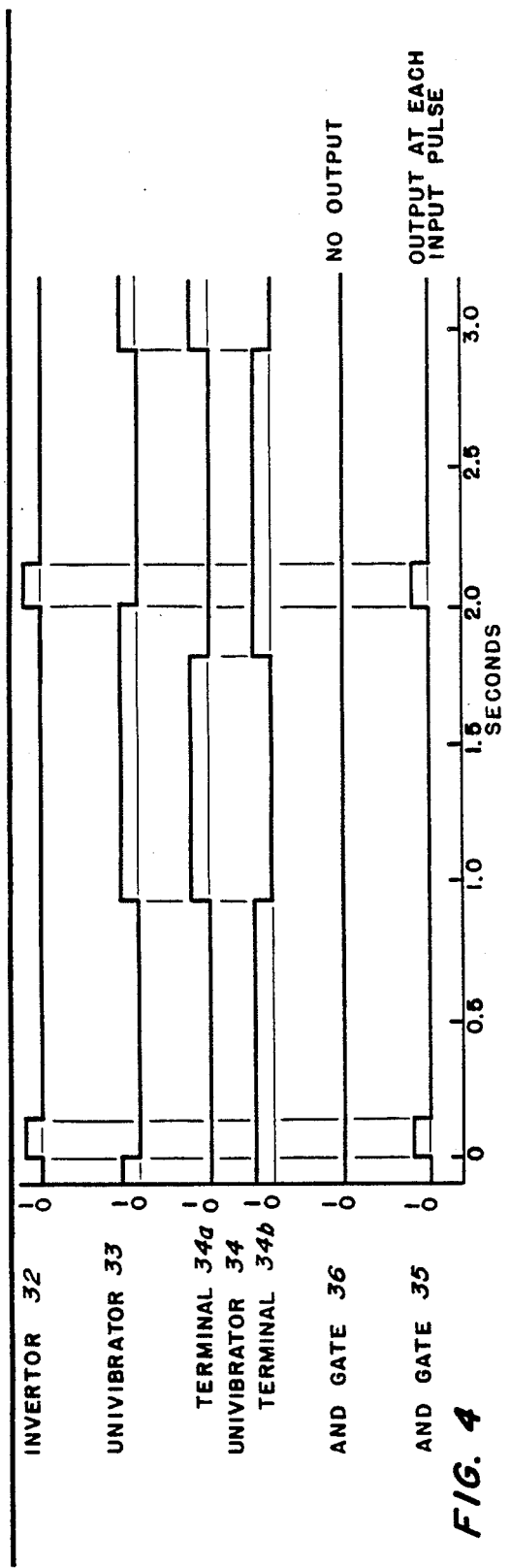
FIG. 4 shows the relationship of the output pulses generated by the evasive action circuit in response to a first torpedo signal repetition rate.
Figure 5:
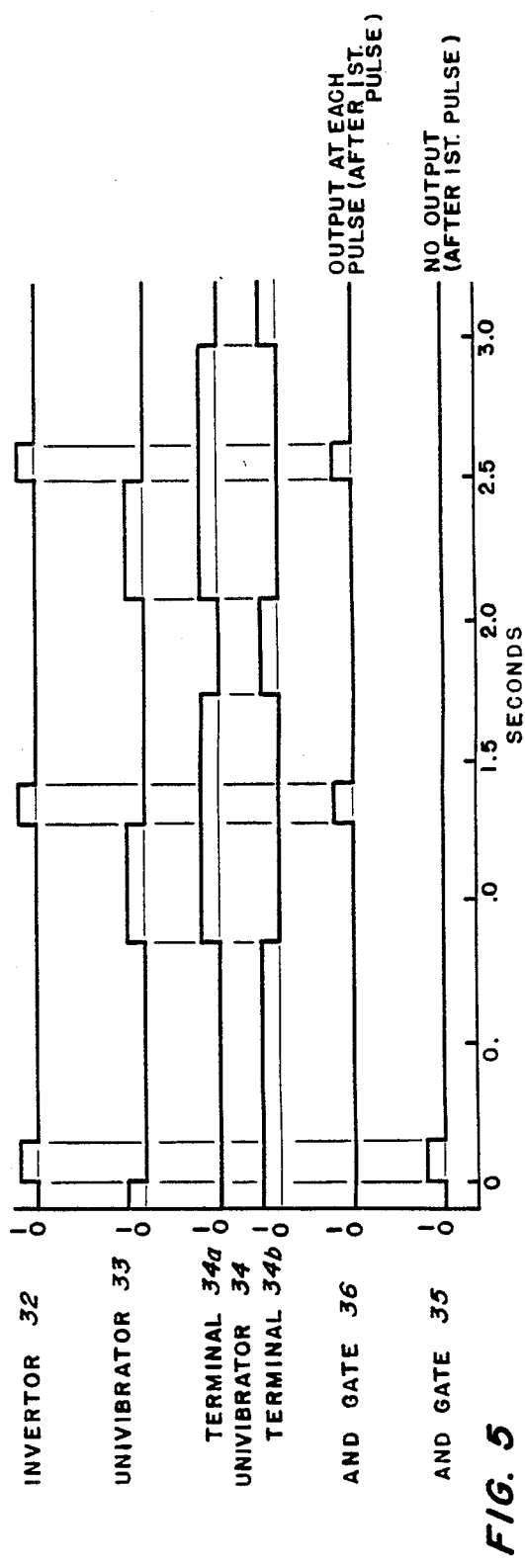
FIG. 5 shows the relationship of the output pulses generated by the evasive action circuit in response to a second torpedo signal repetition rate.

Referring to FIGS. 2a and 2b as well as to FIGS. 4 and 5, the negative-going pulses of univibrators 26 and 26' are connected to OR gate 31 so that gate 31 will give an output whenever one of the simulator channels is responding. The 180 millisecond pulse is inverted in invertor 32 providing a 180 millisecond positive pulse output, the repetition rate of which is the same as the repetition rate of the input signal from the torpedo.

This output pulse is applied to univibrator 33, input 35b of AND gate 35 and input 36c of AND gate 36. Univibrator 35 changes state for a certain period of time, 0.80 seconds in the example of FIGS. 4 and 5, with each input pulse.

When univibrator 33 returns to its normal state it triggers univibrator 34 which changes state for the same period of time as 33. Univibrators 33 and 34 in conjunction with AND gates 35 and 36 and counter 37 differentiate between pulse repetition rates. FIGS. 4 and 5 which show the output of the indicated elements provide an example of this operation. According to the example, a 1.6 second or greater repetition interval between torpedo pulses will have no effect on the evasive action circuit, but torpedo pulses of between 1 to 1.5 seconds repetition interval rates will trigger univibrator 39 causing it to change state to thereby remove the inputs from AND gates 27 and 27' and cause both simulator channels to be gated off. This is accomplished as follows. The input signal from the inverter is 180 milliseconds (0.18 seconds) long and is applied to univibrator 33 and AND gates 35 and 36.

The outputs of univibrators 33 and 34 and gates 35 and 36 are shown in FIG. 4 for a 2 second (greater than 1.6 sec) repetition rate. In the drawings 0 indicates no output and 1 indicates an output. No output occurs from gate 36, but gate 35 has an output for every input pulse. This occurs because as can be seen from FIG. 4, the input to AND gate 36 from inverter 32 at terminal 36c and from univibrator 34 at terminal 34a to terminal 36b are never coincident. At the same time the input from the inverter 32 to AND gate 35 at terminal 35b and input from univibrator 34 at terminal 34b to terminal 35a are coincident for every pulse from inverter 32. The output of gate 35 is applied to OR gate 38, the output of which resets the counter to keep it in a proper state to start a counting sequence.

When the torpedo goes into an increased pulse rate which, as discussed above, indicates that it is approaching close to the simulator, its repetition rate changes to 1.25 seconds. This can be seen in FIG. 5. The outputs of univibrators 35 and 34 and gates 35 and 36 are modified after the first pulse. Gate 36 now has an output for each input pulse and gate 35 has no output. This can be seen by referring to FIGS. 4 and 5. After the first pulse the output of univibrator 34 to input 36b of AND gate 36 and the output from the inverter to input 36c of AND gate 36 are coincident and the outputs from univibrator 34 and inverter 32 to AND gate 35 are not coincident.

The counter now receives input pulses from gate 36. The counter may be responsive to input pulse counts of 1, 2, 3 or 4 and will cause an output pulse to occur from the counter to univibrator 39 upon receipt of the requisite count. If the pulse rate should revert to the slower rate before the requisite pulse is received, gate 35 will again have an output and will reset the counter.

When an output is received from the counter, univibrator 39 is triggered and changes state for 20 seconds. Operating through AND gates 27, 27' it inhibits gates 16 and 16', preventing both channels from responding to an input signal. The univibrator 39 also inhibits gate 36 to prevent further input signals from operating the counter and also passes to OR gate 38 to reset the counter to put it in condition to start another count. Output from 39 is also applied to relay 41 causing it to actuate the programmer to undertake evasive action. The programmer is operable to initiate release of depth charges or decoys.

THE SONAR BEACON

Figure 6:
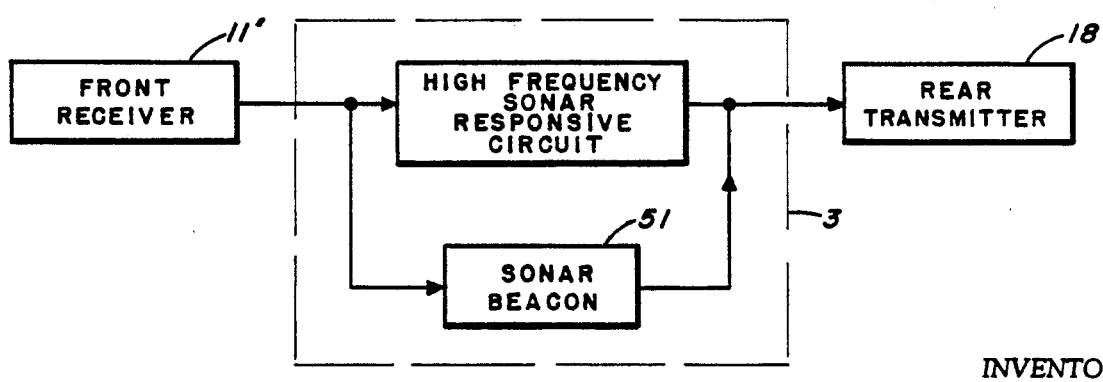
FIG. 6 is a block diagram showing the use of the ship-mounted sonar responsive circuit in the acoustic target simulator system.

Since active ship-mounted sonars normally operate at a much lower frequency than sonar-equipped torpedoes, a separate sonar beacon is included in the target simulator circuit 3 for the fifth mode of operation. As seen in FIG. 6, the sonar system uses only one receiver and one transmitter because shadowing is not critical when the system is operating in this mode of operation. In this mode, the system operates only as an echo-repeater. The sonar beacon picks up signals from a ship-mounted sonar through the front receiver 11' and retransmits the signal at the rear transmitter 18. Sonar beacon signals are blocked from the simulator circuit and simulator circuit signals are also blocked from the sonar beacon. The ship-mounted sonar signals are not within the bandpass of filters 14 and 14' and therefore the signal cannot pass through channels 1 or 2.

CONCLUSION

Obviously many modifications and variations of the present invention are possible in the light of the above teachings. It is therefore to be understood that within the scope of the appended claims the invention may be practiced otherwise than as specifically described.

What is claimed is:

1. An acoustic target simulator comprising
   a receiver mounted on the simulator;
   a transmitter mounted on the simulator;
   circuit means connecting the receiver to the transmitter;
   an evasive action programmer; and
   an evasive action circuit connected to said receiver, transmitter and programmer operable upon receipt of a signal from the receiver to disconnect the receiver from the transmitter and to activate said evasive action programmer.

2. An acoustic target simulator as in claim 1 further comprising
   a filter connected between said receiver and transmitter and operable to pass only high frequency signals; and
   a sonar beacon connected between said receivers and said transmitter and operable upon receipt of a low frequency signal from the receiver to retransmit the signal through the transmitter.

3. An acoustic target simulator as in claim 2 further comprising a noise generator coupled to said transmitter.

4. An acoustic target simulator comprising
   a first and second receiver and a first and second transmitter mounted on the simulator, the first receiver being coupled to the first transmitter and the second receiver being coupled to the second transmitter, said transmitters being operable to retransmit signals picked up by their respective receivers;
   a signal selector circuit connected to said first and second receivers and operable upon receipt of a signal from one of said receivers to disconnect the other said receiver from its transmitter whereby only one transmitter will be operable to retransmit a received signal.

5. An acoustic target simulator as in claim 4 further comprising
   a first and second filter connected respectively between each of said first and second receivers and transmitters and operable to pass only high frequency signals; and
   a sonar beacon connected between one of said receivers and one of said transmitters and operable upon receipt of a low frequency signal from said one receiver to retransmit the signal through said transmitter.

6. The acoustic target simulator as in claim 4 further comprising an evasive action circuit connected to said first and second receiver and operable upon receipt of a signal from either of said receivers to disconnect said first and second receivers from their respective transmitters.

7. An acoustic target simulator as in claim 6 further comprising
   a first and second filter connected respectively between each of said first and second receivers and transmitters and operable to pass only high frequency signals; and
   a sonar beacon connected between one of said receivers and one of said transmitters and operable upon receipt of a low frequency signal from said one receiver to retransmit the signal through said transmitter.

8. An acoustic target simulator as in claim 7 comprising an evasive action programmer connected to said evasive action circuit and operable upon receipt of a signal from said evasive action circuit to initiate an evasive action program.

9. An acoustic target simulator as in claim 8 further comprising a first and second noise generator coupled respectively to said first and second transmitters.

10. An acoustic target simulator comprising
    a first channel having a receiver, a gate and a transmitter connected in series;
    a second channel having a receiver, a gate and a transmitter connected in series;
    a first selector circuit gate;
    a first univibrator;
    a second selector circuit gate;
    a second univibrator;
    means connecting the input of said first univibrator to the output of said first selector circuit gate;
    means connecting the input of said second univibrator to the output of said second selector circuit gate;
    means connecting an output of said first channel receiver and an output of said second univibrator to the input of said first selector circuit gate;
    means connecting an output of said second channel receiver and an output of said first univibrator to the input of said second selector circuit gate; and
    means connecting an output of said second univibrator to said first and second channel gates such that upon a signal being received by one channel before being received by the other channel the gate of said other channel will be closed and no signal will pass to said other channel transmitter.

11. An acoustic target simulator as in claim 10 further comprising
    a first and second filter connected respectively between each of said first and second receivers and transmitters and operable to pass only high frequency signals; and
    a sonar beacon connected between one of said receivers and one of said transmitters and operable upon receipt of a low frequency signal from the receiver to retransmit the signal through the transmitter.

12. An acoustic target simulator as in claim 10 further comprising an evasive action simulator connected to receive the outputs of said first and second univibrators and operable to disable the gates of said first and second channel.

13. An acoustic target simulator as in claim 12 further comprising
    a first and second filter connected respectively between each of said first and second receivers and transmitters and operable to pass only high frequency signals; and
    a sonar beacon connected between one of said receivers and one of said transmitters and operable upon receipt of a low frequency signal from the receiver to retransmit the signal through the transmitter.

14. An acoustic target simulator according to claim 13 further comprising first and second threshold detectors and a first and second integrator connected in series, respectively, between the first and second channel receivers and the first and second selector circuit gates.

15. The acoustic target simulator of claim 14 further comprising a third univibrator connected to receive an output of said first and second univibrators;

a first AND gate connected to receive the outputs of the first and second univibrators;

a second AND gate connected to receive the outputs of the first and second univibrators;

a fourth univibrator connected to receive the output of the third univibrator and having a first output connected to said first AND gate and a second output connected to said second AND gate;

a counter connected to receive the output of said first and second AND gate and operable upon receipt of a proper number of signals from said second AND gate to give an output signal;

evasive action initiating means; and a fifth univibrator connected to the output of said counter and having a first output connected to said first and second channel gates and a second output connected to said evasive action circuit and being operable upon receipt of a signal from the counter to disable said first and second channels and to initiate evasive action.

16. An acoustic target simulator according to claim 15 wherein said first and second channels further include a noise generator.

* * * * *